United States Patent
Liu et al.

(10) Patent No.: US 10,165,483 B1
(45) Date of Patent: Dec. 25, 2018

(54) MITIGATING INTERFERENCE IN A DISTRIBUTED ANTENNA SYSTEM

(71) Applicant: Sprint Spectrum LP, Overland Park, KS (US)

(72) Inventors: Chunmei Liu, Great Falls, VA (US); Pratik Kothari, Herndon, VA (US); Hemanth Pawar, Brambleton, VA (US); Krishna Sitaram, Chantilly, VA (US)

(*) Notice: Subject to any disclaimer, the term of this patent is extended or adjusted under 35 U.S.C. 154(b) by 39 days.

(21) Appl. No.: 15/284,699

(22) Filed: Oct. 4, 2016

(51) Int. Cl.
*H04W 36/06* (2009.01)
*H04W 36/30* (2009.01)
*H04W 36/00* (2009.01)
*H04W 88/08* (2009.01)

(52) U.S. Cl.
CPC ....... *H04W 36/06* (2013.01); *H04W 36/0094* (2013.01); *H04W 36/30* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 8,750,878 B2* | 6/2014 | Park | H04B 7/2606 455/436 |
| 9,210,668 B2* | 12/2015 | Palanki | H04W 52/245 |
| 2013/0095749 A1* | 4/2013 | Kummetz | H04B 7/15535 455/9 |
| 2013/0260706 A1* | 10/2013 | Singh | H04W 88/085 455/257 |
| 2014/0248050 A1 | 9/2014 | Crilly et al. | |
| 2015/0237557 A1* | 8/2015 | Alonso-Rubio | H04W 36/30 455/437 |
| 2017/0171820 A1* | 6/2017 | Kronestedt | H04W 52/0245 |

* cited by examiner

*Primary Examiner* — Bunjob Jaroenchonwanit

(57) ABSTRACT

Mitigating interference in distributed antenna systems (DAS) includes determining, at a processing node of the DAS, that a first wireless device attached to a first access node is within a coverage area of one or more antennae of the DAS, and transmitting, from the processing node to the first access node, a request to trigger a handover of the first wireless device from the first access node to the DAS. The first access node triggers the handover by instructing the first wireless device to perform a signal measurement.

11 Claims, 4 Drawing Sheets

MITIGATING INTERFERENCE IN A DISTRIBUTED ANTENNA SYSTEM

TECHNICAL BACKGROUND

Telecommunication systems, such as cellular networks or other wireless networks, rely on multiple network elements to provide reliable services. For example, multiple access points may be located within close proximity to one another. In some configurations, an antenna system (e.g., a distributed antenna system (DAS)) may be deployed to provide wireless services over a geographic area. However, a wireless device within a coverage area of the antenna system and in communication with a separate access node may interfere with the communications of the antenna system. It may be beneficial for a system to mitigate interference experienced at the antenna system caused by proximate wireless devices.

OVERVIEW

Exemplary embodiments described herein include systems, methods, and processing nodes for mitigating interference in distributed antenna systems. A method for mitigating interference in distributed antenna systems includes determining, at a processing node of the DAS, that a first wireless device attached to a first access node is within a coverage area of one or more antennae of the DAS, and transmitting, from the processing node to the first access node, a request to trigger a handover of the first wireless device from the first access node to the DAS. The first access node triggers the handover by instructing the first wireless device to perform a signal measurement.

A system for mitigating interference in distributed antenna systems includes a distributed antenna system (DAS) comprising a plurality of antennae; and a processing node communicatively coupled to the plurality of antennae. The processing node can be configured to perform operations comprising detecting a first uplink signal transmitted from a first wireless device to an access node, wherein the first wireless device is within a coverage area of the DAS, and wherein the access node is outside the coverage area of the DAS, and transmitting, to the access node, a request to trigger a handover of the first wireless device to the DAS. The first uplink signal utilizes a frequency band used by the DAS.

A processing node for mitigating interference in distributed antenna systems is configured to perform operations including receiving, from a distributed antenna system (DAS), an indication that a first wireless device attached to a first access node is within a coverage area of one or more antennae of the DAS, and transmitting a signal measurement command to the first wireless device. Upon the first wireless device determining that signal measurements meet threshold levels, the first wireless device requests a handover from the first access node to the DAS.

DETAILED DESCRIPTION

Figure 1:
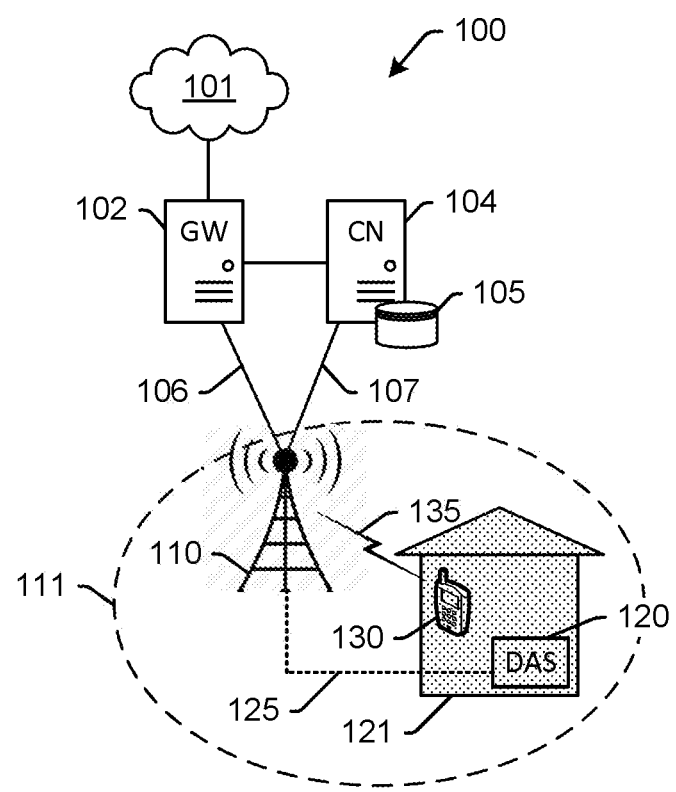
FIG. 1 depicts an exemplary system for mitigating interference in distributed antenna systems.

In embodiments disclosed herein, a wireless device attached to a macro access node is determined to be within a coverage area of a distributed antenna system (DAS). The DAS may include one or more processing nodes and a plurality of antennae distributed within a defined space, such as a building, complex of buildings, park, etc. The plurality of antennae serve as access points for one or more participant wireless devices within the defined space, or within a coverage area of one or more of the plurality of antennae. The wireless device attached to the macro access node is therefore a non-participant wireless device, and may need to use a higher uplink transmit power for transmitting uplink signals than the participant wireless devices attached to the DAS. As described herein, this can potentially result in interference, increased power consumption, and reduced quality of service at the participant wireless devices, particularly when the non-participant wireless device is communicating using the same frequency band as the DAS. Further, the macro access node may be distant from the DAS, such that it is well outside the coverage area of the DAS, even though the non-participant wireless device may be within a coverage area of both the macro access node and the DAS.

Consequently, operations described herein include initiating a handover of the non-participant wireless device from the macro access node to the DAS upon determining that the non-participant wireless device is within the coverage area of one or more of the plurality of antennae of the DAS. The DAS can detect the presence of the non-participant wireless device by detecting an uplink signal from the non-participant wireless device. The uplink signal may be detected by one or more antennae of the DAS. Alternatively or in addition, the presence of the non-participant wireless device may be determined by an interference indication at the DAS. The interference indication can comprise a signal strength of the uplink signal from the non-participant device exceeding a threshold. In some embodiments, the interference indication can comprise an uplink transmit power of the uplink signal from the non-participant device exceeding a predefined uplink transmit power by a threshold. The predefined uplink transmit power may include an uplink transmit power used by participant wireless devices. In other embodiments, the interference indication can comprise an uplink transmit power of the participant wireless devices exceeding a threshold.

To mitigate the negative effects of the interference caused by the higher uplink transmit power of the non-participant wireless device, the DAS can instruct the participant wireless devices to utilize a reduced uplink transmit power prior to requesting a handover of the non-participant wireless device. To request the handover, the DAS can transmit a request to the macro access node to trigger a measurement event at the non-participant wireless device. The request may comprise an indication that the DAS is using a reduced uplink transmit power for participant wireless devices. The request may be transmitted via a direct connection between a node of the DAS and the macro access node, such as, for instance, an X2 connection.

Upon receiving the request and/or the indication of reduced uplink transmit power, the macro access node triggers a measurement event by instructing the non-participant wireless device to scan for signal measurements, such as a signal strength of a downlink signal transmitted by one or more antennae of the DAS. Upon the signal strength meeting a threshold, the non-participant wireless device can request a handover from the macro access node to the DAS. In some embodiments, the instruction transmitted from the macro access node to the non-participant wireless device can include a signal level threshold based on the indication received from the DAS. The non-participant wireless device responds to the macro access node if the downlink signal strength of, for instance, a downlink reference signal from the DAS meets one or more signal level thresholds. The macro access node then initiates a handover procedure to handover the non-participant wireless device to the DAS. Upon the non-participant wireless device attaching to the DAS, it becomes a participant wireless device, uses less uplink transmit power, and causes little to no interference to other participant wireless devices. These and additional operations are further described with respect to the embodiments depicted in FIGS. 1-4 below.

FIG. 1 depicts an exemplary system 100 for mitigating interference in distributed antenna systems. System 100 comprises a communication network 101, gateway 102, controller node 104, macro access node 110, distributed antenna system 120 within predefined area 121, and end-user wireless device 130. Macro access node 110 is illustrated as having coverage area 111, and end-user wireless device 130 is located within coverage area 111 and within predefined area 121. End-user wireless device 130 accesses network services from macro access node 110 via an air interface 135 deployed by macro access node 110. Further, DAS 120 is communicatively coupled to macro access node 110 via communication link 125, which may be similar to or the same as an X2 communication link, or any wired or wireless link. Macro access node 110 and DAS 120 comprise appropriate transceivers, antennae, and other components that enable direct communication between macro access node 110 and DAS 120 and processing nodes thereof, as further described below.

In operation, end-user wireless device 130 is determined to be within a coverage area of DAS 120 by an antenna or processing node within DAS 120. For example, as further described in FIG. 2B, DAS 120 may include one or more processing nodes and a plurality of antennae distributed within a defined space, such as building 120, or a complex of buildings, or a park, etc. The plurality of antennae serve as access points for one or more participant wireless devices within a coverage area of one or more of the plurality of antennae. Since end-user wireless device 130 is attached to macro access node 110, it can be referred to as a non-participant wireless device. Non-participant wireless device 130 may need to use a higher uplink transmit power than the participant wireless devices (not shown) attached to DAS 120, potentially resulting in interference and other issues. DAS 120 can detect the presence of non-participant wireless device 130 by detecting an uplink signal from non-participant wireless device 130, or based on an interference indication at DAS 120, such as an uplink transmit power of non-participant device 130 exceeding a threshold, or the execution of gain control operations at DAS 120. Upon detecting the presence of non-participant wireless device 130, DAS 120 can instruct its participant wireless devices to utilize a reduced uplink transmit power, thereby increasing its own downlink power, and subsequently transmitting a request to macro access node 110 to initiate a handover of non-participant wireless device 130 to DAS 120. To request the handover, DAS 120 can transmit a request to macro access node 125 to trigger a measurement event at non-participant wireless device 130. The request may comprise an indication that DAS 120 has prescribed a reduced uplink transmit power for its participant wireless devices. The request may be transmitted via direct connection 125 between DAS 120 and macro access node 110. Upon receiving the request and/or the indication of reduced uplink transmit power, macro access node 110 triggers a measurement event by instructing non-participant wireless device 130 to scan for signal measurements, such as a signal strength of a downlink signal transmitted by one or more antennae of DAS 120. Upon the signal strength meeting a threshold, non-participant wireless device 130 can request a handover from macro access node 110 to DAS 120.

Macro access node 110 can be any network node configured to provide communication between end-user wireless device 130 and communication network 101, including standard access nodes and/or short range, low power, small access nodes. For instance, macro access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while macro access node 110 is illustrated in FIG. 1, any number of access nodes can be implemented within system 100.

Macro access node 110 can comprise a processor and associated circuitry to execute or direct the execution of computer-readable instructions to perform operations such as those further described herein. See, for example, FIG. 2A. Briefly, macro access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, macro access node 110 can receive instructions and other input at a user interface. Macro access node 110 communicates with gateway node 102 and controller node 104 via communication links 106, 107. Macro access node 110 may communicate with other access nodes or DAS 120 using a direct link 125, such as an X2 link or similar.

Wireless device 130 may be any device, system, combination of devices, or other such communication platform capable of communicating wirelessly with macro access node 110 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via macro access node 110. Other types of communication platforms are possible. Wireless device 130 may further comprise a relay node for relaying services from access node 110 to other end-user wireless devices. For example, wireless device 130 may be a relay node for relaying network services to other devices within building 121 in which it is located.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information such as handover thresholds and other information related to wireless device 130 and DAS 120. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2A:
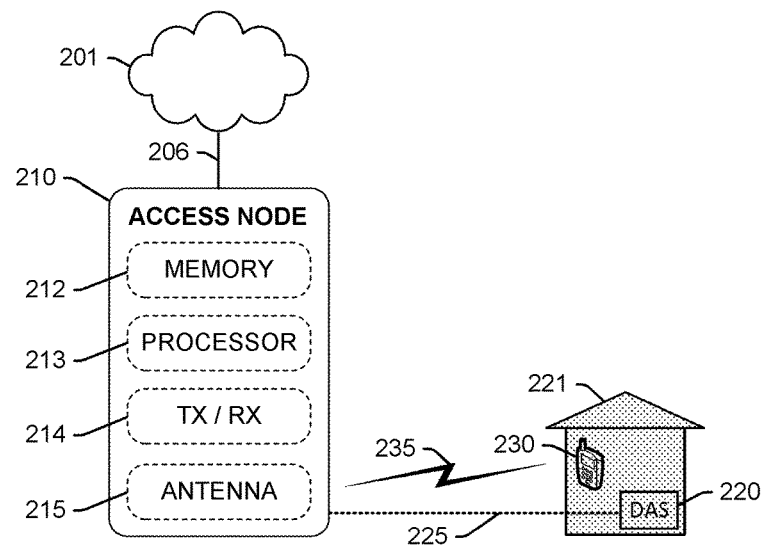
FIGS. 2A-2B depict an exemplary access node and an exemplary distributed antenna system, respectively.
Figure 2B:
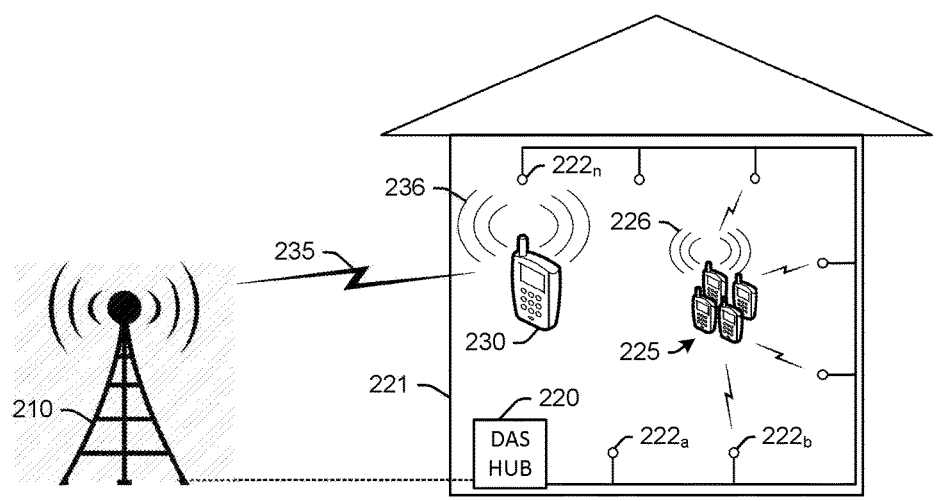

FIGS. 2A-2B respectively depict an exemplary macro access node and distributed antenna system. With reference to FIG. 2A, access node 210 is configured as an access point for providing network services from network 201 to end-user wireless device 230 via communication link 235. Access node 210 is illustrated as comprising a memory 212 for storing logical modules that perform operations described herein, a processor 213 for executing the logical modules, and a transceiver 214 for transmitting and receiving signals via antenna 215. Although only one transceiver is depicted in access node 210, additional transceivers may be incorporated in order to deploy multiple frequency bands and to facilitate communication with other network nodes, such as a processing node of DAS 220 via communication link 225. In some embodiments, access node 210 provides network services to a DAS hub of DAS 220, enabling DAS 220 to forward said network services to participant wireless devices attached thereto. Communication link 225 may be wireless, or wired, such as an X2 or similar link. Further, access node 210 is communicatively coupled to network 201 via communication interface 206, which may be any wired or wireless link as described above.

With reference to FIG. 2B, a distributed antenna system (DAS) within a defined space 221 comprises at least a DAS hub 220, and a plurality of antennae $222_a$, $222_b$, ... $222_n$, each of which is coupled to DAS hub via connector 223. The DAS may comprise any configuration of antennas or access points configured to provide participant wireless devices 225 access to network services via an access node, such as macro access node 210, or any other access node. In some embodiments, the DAS may comprise one or more filters (e.g., low pass filters), one or more repeaters, one or more amplifiers, and any other suitable components that are not shown for the sake of simplicity.

In operation, one or more antennae $222_{a-n}$ may detect an uplink signal 236 from non-participant wireless device 230. The uplink signal may use an uplink transmit power that is significantly higher than a predefined uplink transmit power of an uplink signal 226 transmitted by participant wireless devices 225. For example, the uplink transmit power for non-participant wireless device 230 may not be controlled in the manner that the uplink transmit power for participant wireless devices 225 is controlled and, thus, uplink transmission 236 from non-participant wireless device 230 may overload one or more of antennae $222_{a-n}$. DAS may use a broadband filter, enabling signal from the participant and the nonparticipant devices to both be received by the antenna. When strong uplink signal 235 from nonparticipant wireless device 230 begins to overdrive one or more of antennae $222_{a-n}$, non-linearities appear across the entire band. Typical DAS systems prevent the non-linearities from polluting their spectrum by using automatic gain control (AGC) mechanisms. However, AGC can reduce the power of both non-participant and participant devices, causing the signal to noise ratio of the participant to ultimately decrease and/or the degraded conditions induced by the overdriven receive path will ultimately get worse.

Consequently, upon detecting uplink signal 235 and/or interference/non-linearities caused therefrom, the DAS can instruct the participant wireless devices 225 to utilize a reduced uplink transmit power, and transmit a request to macro access node 210 to trigger a handover of non-participant wireless device 230 to the DAS. This reduction in UL power helps in improving the battery life and quality of service for of participant devices 225. Moreover, if such reduction in uplink transmit power of participant devices 225 is not executed, non-participant wireless device may not be able to measure a strong downlink signal from the DAS, even while being within the coverage area of antennae $222_{a-n}$, therefore will continue to be served by macro access node 210.

Figure 3:
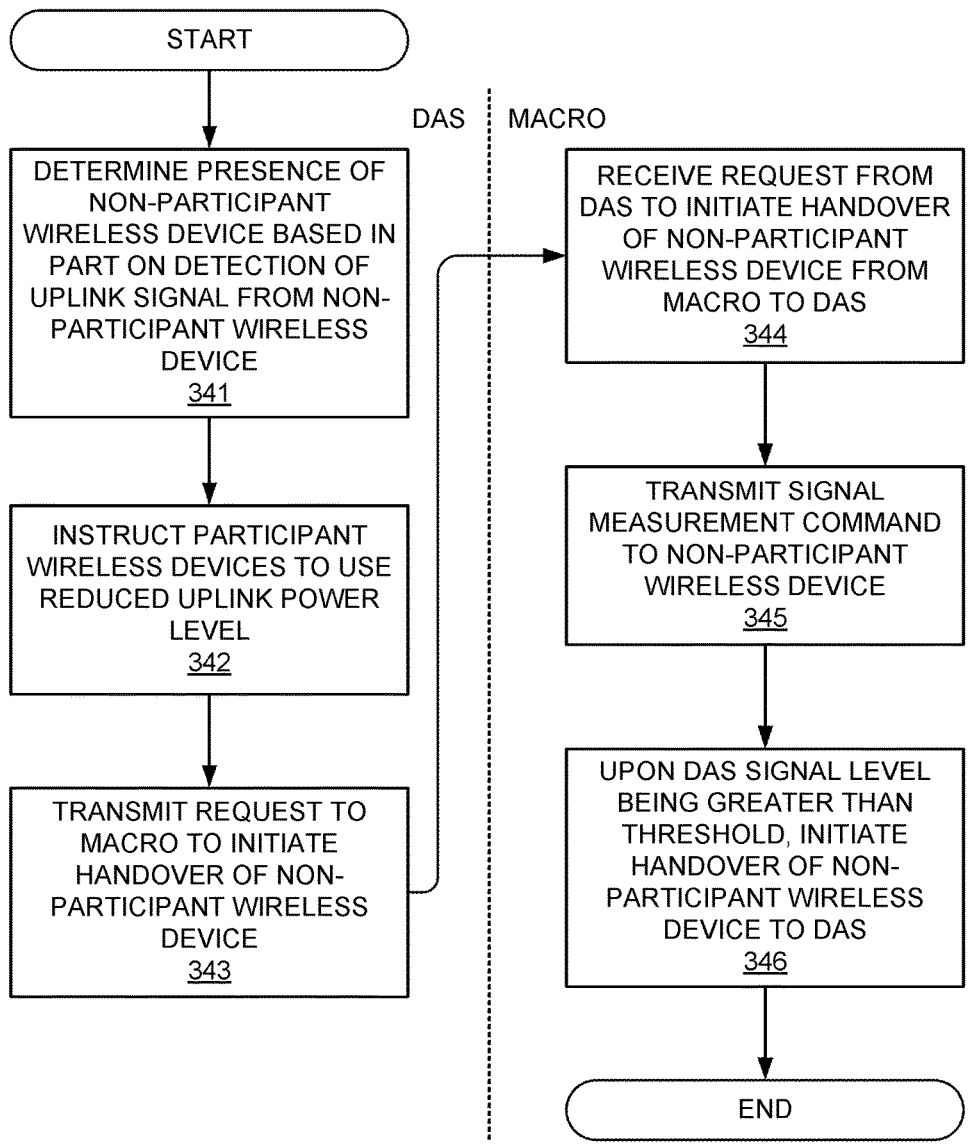
FIG. 3 depicts an exemplary method for mitigating interference in distributed antenna systems.

FIG. 3 depicts an exemplary method for mitigating interference in distributed antenna systems. The method of FIG. 3 is illustrated with respect to a macro access node and a DAS. In other embodiments, the method can be implemented with any suitable network element. Although FIG. 3 depicts operations performed in a particular order for purposes of illustration and discussion, these operations are not limited to any particular order or arrangement. One skilled in the art, using the disclosures provided herein, will appreciate that various steps of the methods can be omitted, rearranged, combined, and/or adapted in various ways.

The method begins at 341 when a DAS determines a presence of a wireless device attached to a macro access node within its coverage area, i.e. a non-participant wireless device. The detection may be based on an uplink signal transmitted from the non-participant wireless device. For instance, the non-participant wireless device may need to use a higher uplink transmit power for transmitting uplink signals than the participant wireless devices attached to the DAS. As described herein, this can potentially result in interference, increased power consumption, and reduced quality of service at the participant wireless devices, particularly when the non-participant wireless device is communicating using the same frequency band as the DAS, and communicating with a macro access node that is distant from the DAS. Alternatively or in addition, the presence of the non-participant wireless device may be determined by an interference indication at the DAS. The interference indication can comprise a signal strength of the uplink signal from the non-participant device exceeding a threshold. In some embodiments, the interference indication can comprise an uplink transmit power of the uplink signal from the non-participant device exceeding a predefined uplink transmit power by a threshold. The predefined uplink transmit power may include an uplink transmit power used by participant wireless devices. In other embodiments, the interference indication can comprise an uplink transmit power of the participant wireless devices exceeding a threshold. The interference indication may be based on non-linearities detected or AGC mechanisms triggered as a result of strong uplink signals from the nonparticipant wireless device overdriving one or more antennae of the DAS.

At 342, the DAS can instruct the participant wireless devices to utilize a reduced uplink transmit power, so as to mitigate the negative effects of the interference caused by the higher uplink transmit power of the non-participant wireless device. This may further increase the downlink transmit power of the DAS, thereby enabling a subsequent signal measurement performed by the non-participant device to trigger a handover to the DAS. To trigger the handover, the DAS may transmit a request at 343 to the macro access node to trigger a measurement event at the non-participant wireless device. The request may comprise an indication that the DAS is using a reduced uplink transmit power for participant wireless devices. The request may be transmitted via a direct connection between a node of the DAS and the macro access node, such as, for instance, an X2 connection.

At 344, the macro access node receives the request and/or the indication of reduced uplink transmit power. Based on the request, at 345, the macro access node can transmit an instruction of command to the non-participant wireless device, instructing the non-participant wireless device to scan for signal measurements, such as a signal strength of a downlink signal transmitted by one or more antennae of the DAS. At 346, upon the signal strength meeting a threshold, the non-participant wireless device can request a handover from the macro access node to the DAS. In some embodiments, the instruction transmitted from the macro access node to the non-participant wireless device can include a signal level threshold based on the indication received from the DAS. The non-participant wireless device responds to the macro access node if the downlink signal strength of, for instance, a downlink reference signal from the DAS meets one or more signal level thresholds. The macro access node then initiates a handover procedure to handover the nonparticipant wireless device to the DAS. Upon the non-participant wireless device attaching to the DAS, it becomes a participant wireless device, uses less uplink transmit power, and causes little to no interference to other participant wireless devices.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: macro access nodes 110, 210, DAS 120, DAS hub 220, and/or network 101.

Figure 4:
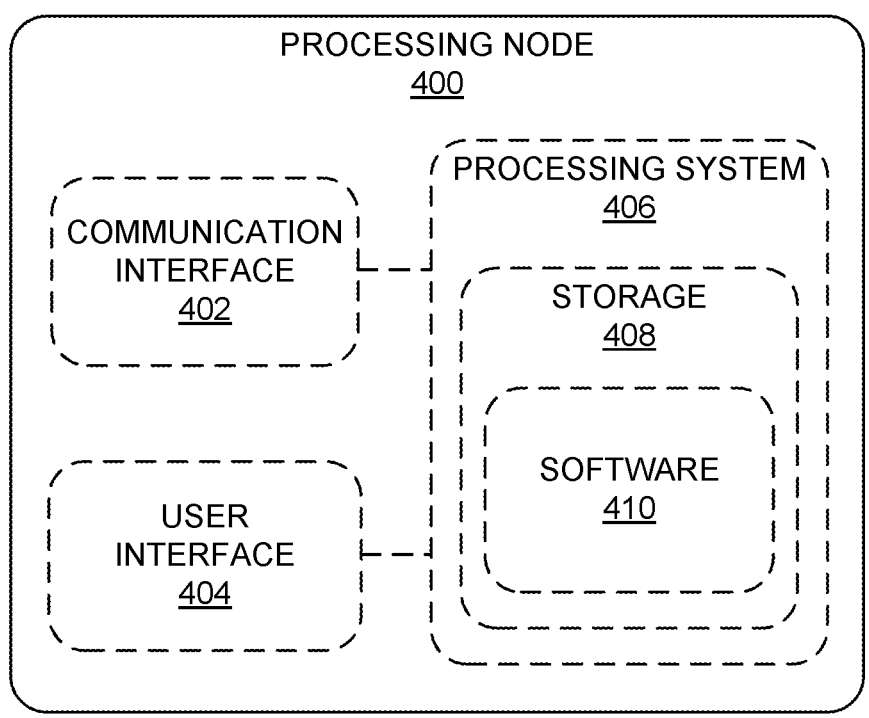
FIG. 4 depicts an exemplary processing node for mitigating interference in distributed antenna systems.

FIG. 4 depicts an exemplary processing node 400 comprising communication interface 402, user interface 404, and processing system 406 in communication with communication interface 402 and user interface 404. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. For example, storage 408 may include a buffer. Software 410 may include computer programs, firmware, or some other form of machine-readable instructions, including an operating system, utilities, drivers, network interfaces, applications, or some other type of software. For example, software 410 may include a scheduling module. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference in a distributed antenna system (DAS), the method comprising:
   detecting, at a processor coupled to the DAS, a first uplink signal transmitted from a first wireless device to a first access node, the first wireless device being attached to the first access node;
   based on detecting the first uplink signal, determining, by the processor, that the first wireless device is within a coverage area of one or more antennae of the DAS; and
   transmitting, from the processor to the first access node, a request to trigger a handover of the first wireless device from the first access node to the DAS.

2. The method of claim 1, wherein the first access node and the one or more antennae of the DAS utilize a common frequency band.

3. The method of claim 1, further comprising determining that a first signal strength of the first uplink signal exceeds a threshold.

4. The method of claim 3, wherein the threshold is based on a second signal strength of a second uplink signal transmitted from a second wireless device to the DAS.

5. The method of claim 3, wherein determining that the first signal strength of the first uplink signal exceeds the threshold is based on initiation of an automatic gain control procedure at the DAS.

6. The method of claim 1, further comprising instructing one or more wireless devices attached to the DAS to use a reduced uplink power level.

7. The method of claim 6, wherein the request to trigger the handover comprises an indication of the reduced uplink power level.

8. The method of claim 7, wherein the instruction transmitted to the first wireless device comprises updated handover thresholds based on the reduced uplink power level.

9. A processing node for mitigating interference in a distributed antenna system (DAS), the processing node comprising a processor that is configured to perform operations comprising:
   receiving, from a distributed antenna system (DAS), an indication that a first wireless device attached to a first access node is within a coverage area of one or more antennae of the DAS, the indication being based on an uplink signal transmitted from the wireless device to an access node; and
   transmitting a signal measurement command to the first wireless device,
   wherein upon the first wireless device determining that signal measurements meet threshold levels, the first wireless device requests a handover from the first access node to the DAS.

10. The processing node of claim 9, wherein:
    the first wireless device is within a coverage area of the DAS, and
    the access node is outside the coverage area of the DAS.

11. The processing node of claim 10, wherein the signal measurement meets threshold levels upon a first downlink signal from the DAS being higher than a first threshold, and a second downlink signal from the access node being lower than a second threshold.

* * * * *